US008483876B2

(12) United States Patent
Ohno (10) Patent No.: US 8,483,876 B2
(45) Date of Patent: Jul. 9, 2013

(54) CONTROLLER OF MOBILE ROBOT (75) Inventor: Nobuyuki Ohno, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 502 days.

(21) Appl. No.: 12/747,094

(22) PCT Filed: Nov. 13, 2008

(86) PCT No.: PCT/JP2008/003310
§ 371 (c)(1),
(2), (4) Date: Jun. 9, 2010

(87) PCT Pub. No.: WO2009/075059
PCT Pub. Date: Jun. 18, 2009

(65) Prior Publication Data
US 2010/0268382 A1 Oct. 21, 2010

(30) Foreign Application Priority Data

Dec. 10, 2007 (JP) .................. 2007-318929

(51) Int. Cl.
*B25J 13/00* (2006.01)
*G05D 1/02* (2006.01)

(52) U.S. Cl.
USPC .............................. 700/255; 901/1

(58) Field of Classification Search
USPC .................. 700/62, 213, 228, 245, 247, 249, 700/251, 253, 255, 260; 901/1; 318/568.12, 318/568.16, 568.17, 568.19
See application file for complete search history.

(56) References Cited

U.S. PATENT DOCUMENTS

| 6,305,484 | B1 * | 10/2001 | Leblanc | 180/167 |
|---|---|---|---|---|
| 6,505,096 | B2 * | 1/2003 | Takenaka et al. | 700/245 |
| 6,748,292 | B2 * | 6/2004 | Mountz | 700/214 |
| 7,975,959 | B2 * | 7/2011 | Perry et al. | 244/50 |
| 7,996,109 | B2 * | 8/2011 | Zini et al. | 700/245 |
| 8,165,718 | B2 * | 4/2012 | Ota et al. | 700/259 |
| 2004/0093650 | A1 * | 5/2004 | Martins et al. | 901/1 |
| 2005/0029029 | A1 * | 2/2005 | Thorne | 180/167 |
| 2007/0129849 | A1 * | 6/2007 | Zini et al. | 700/258 |
| 2007/0239315 | A1 * | 10/2007 | Sato et al. | 700/245 |
| 2008/0065269 | A1 * | 3/2008 | Hasegawa | 700/260 |
| 2008/0133055 | A1 * | 6/2008 | Hasegawa | 700/252 |
| 2009/0148035 | A1 * | 6/2009 | Ohno et al. | 382/153 |
| 2012/0029697 | A1 * | 2/2012 | Ota et al. | 700/253 |

FOREIGN PATENT DOCUMENTS

| EP | 1825966 A1 | 8/2007 |
|---|---|---|
| JP | 2006-110676 | 4/2006 |
| JP | 2007-160428 | 6/2007 |

* cited by examiner

*Primary Examiner* — Khoi Tran
*Assistant Examiner* — Jason Holloway
(74) *Attorney, Agent, or Firm* — Rankin, Hill & Clark LLP (57) ABSTRACT

A controller for a mobile robot which carries out task of moving an object so as to make a position of a representative point of the object and a posture of the object follow a desired position trajectory and a desired posture trajectory, in a state where distal portions of arms is made to contact a portion adjacent to one end of the object, which variably sets the position of the representative point of the object in an object coordinate system when the object is observed in the yaw axis direction, at least in accordance with the change of the desired posture about the yaw axis in the desired posture trajectory. By doing so, movement of the object appropriate for the changing pattern of the desired posture of the object is carried out.

7 Claims, 5 Drawing Sheets

CONTROLLER OF MOBILE ROBOT

BACKGROUND OF THE INVENTION

1. Technical Field

The present invention relates to a controller of a mobile robot which performs an operation of holding an object, such as a cart, with hands at distal portions of arms thereof, and moving the object such that the position and the posture of the object follow desired trajectories.

2. Description of the Related Art

A technique for having a mobile robot perform an operation of moving an object, such as a cart, with the distal portions of the arms of the mobile robot kept in contact with predetermined portions at one end of the object has been proposed by the present applicant as disclosed in, for example, Japanese Patent Application Laid-Open No. 2007-160428 (hereinafter referred to as patent document 1). According to the technique, the motions of a bipedal mobile robot as the mobile robot are controlled such that the position of a representative point of the object and the posture of the object follow a desired position trajectory and a desired posture trajectory, respectively, based on a movement scheme of the object.

However, in this type of conventional technique, the representative point of the object which should follow the desired position trajectory of the object is set fixedly with respect to the object. This has been presenting the following inconvenience.

Figure 5A:
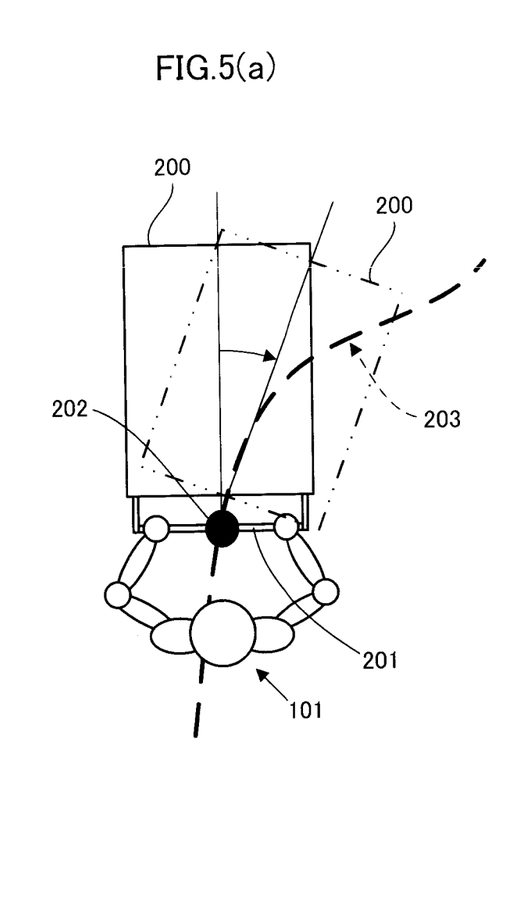
Figure 5B:
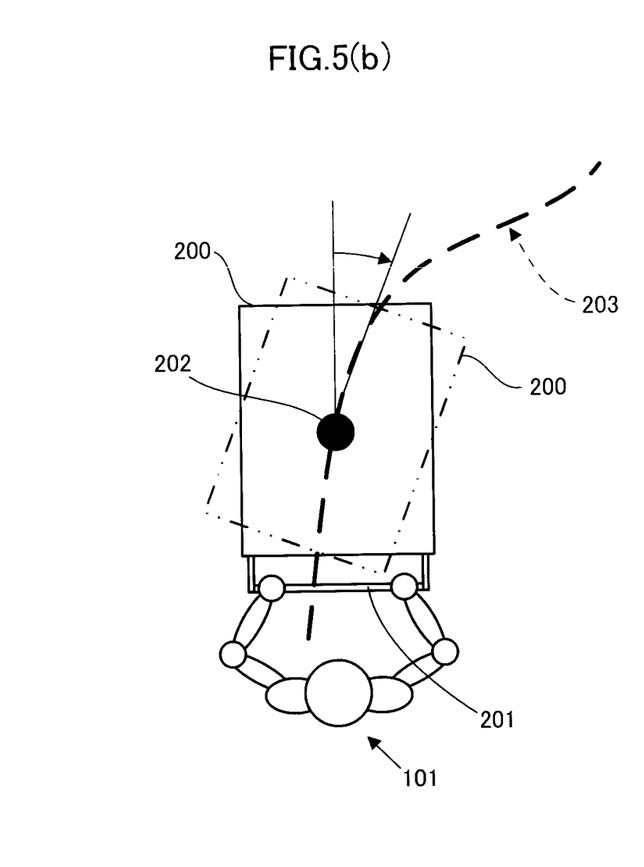

For example, as is shown in FIGS. 5(a) and (b), a case is assumed where a robot 101 pushes and moves a cart 200 in the state of the robot 101 holding a handle 201 at one end of the cart 200 as an object by distal portions (hands) of arms 102, 102. FIGS. 5(a) and (b) are plan views illustrating the robot 101 and the cart 200 observed from above, at one point in time during movement of the robot 101 and the cart 200.

It is assumed that a spatial desired route 203 defined by the desired position trajectory of a representative point 202 of the cart 200 is curved at a relatively large degree of curve, at the front of the current traveling direction of the robot 101 and the cart 200. Further, it is assumed that a desired posture of the cart 200 on the desired route 203 (the desired posture of the cart 200 observed in the yaw axis direction) is a posture in which the longitudinal direction of the cart 200 is in the tangential direction of the desired route 203 (same direction as a direction of a moving velocity vector of the representative point 202 of the cart 200 on the desired route 203). The "yaw axis" means an axis in the direction perpendicular to a floor surface in an environment in which a mobile robot 101 and the cart 200 move or an axis in the vertical direction.

In such case, the robot 101 tries to make the posture of the cart 200 follow the desired posture (posture of the cart 200 indicated by two-dot chain line in FIGS. 5(a) and (b)), by making the cart 200 rotate about the yaw axis taking the representative point 202 as a supporting point, while making the representative point 202 of the cart 200 follow the desired position on the desired route 203.

In the case where the representative point 202 of the cart 200 is set to the end on the robot 101 side, as is shown in FIG. 5(a), the amount of movement of the portion away from the representative point 202 of the cart 200 (end on the other side from the end on the robot 101 side) about the yaw axis becomes large. Therefore, in the case where obstacles exist at the side of the desired route, such as when the cart 200 is moved in a relatively narrow pathway, there is a fear that collision occurs between the cart 200 and the obstacles. Further, the moment of inertia of the cart 200 about the yaw axis passing the representative point 202 is relatively large. Therefore, although the stability of the posture of the cart 200 with respect to variation in the force acting on the cart 200 from the robot 101 is high, it is difficult to make the posture of the cart 200 follow the desired posture in a short time with respect to the sudden change in the desired posture of the cart 200. In such case, the actual moving route and the desired route of the cart 200 tends to deviate from the influence of the restriction in the position-posture relationship between the robot 101 and the cart 200, and the like.

On the other hand, as is shown in FIG. 5(b), in the case where the representative point 202 of the cart 200 is set to a position away from the robot 101 towards the end on the other side from the end on the robot 101 side (in the illustrated example, approximately at the middle position of the cart 200), the amount of movement of the portion away from the representative point 202 of the cart 200 when making the posture of the cart 200 change towards the desired posture becomes smaller than in the case shown in FIG. 5(a). Further, the moment of inertia of the cart 200 about the yaw axis passing the representative point 202 is smaller than in the case shown in FIG. 5(a).

In this case, however, because the moment of inertia of the cart 200 is small, the posture of the cart 200 tends to change from small variation in the force acting on the cart 200 from the robot 101, even in the case where the desired posture of the object is made constant and the object is made to move linearly. Further, in the case where the posture of the cart 200 deviates with respect to the desired posture from the influence of the variation in the force acting on the cart 200 from the robot 101 or from a disturbance, it is frequently the case where the robot 101 must move in the lateral direction with respect to the desired route 203 (direction approximately orthogonal to the desired route 203), in order to resolve the deviation of the posture of the cart 200 while maintaining an appropriate position-posture relationship between the robot 101 and the cart 200. Therefore, it is frequently the case where the robot 101 must move in the lateral direction even if the desired route 203 is an approximately linear route. Consequently, it becomes difficult to increase the traveling speed of the robot 101 and the cart 200.

As described above, in the conventional technique of fixedly setting the representative point of the object, there are inconveniences such as a decrease in the followability of the posture of the object to the desired posture, or an occurrence of a situation where it is difficult to increase the traveling speed of the object, according to the changing pattern of the desired posture trajectory of the object.

SUMMARY OF THE INVENTION

In view of the above circumstances, an object to be solved by the present invention is to provide a controller of a mobile robot capable of performing movement of the object appropriate for the changing pattern of the desired posture of the object.

According to a first aspect of the present invention, there is provided a controller of a mobile robot which performs task of making an object move so as to make a position of a representative point (point representing a spatial position of the object) of the object and a posture of the object follow a desired position trajectory and a desired posture trajectory, respectively, in the state of contacting a distal portion of an arm to a predetermined portion adjacent to one end of the object, the controller comprising: an object representative point setter which variably sets a position of the representative point of the object, when the object is observed in the yaw axis direction, in an object coordinate system fixed with respect to the object, at least in accordance with a change in the desired posture about the yaw axis in the desired posture trajectory (a first aspect of the invention).

In the present invention, the desired position trajectory of the representative point of an object means the time series of the spatial desired position of the representative point. Similarly, the desired posture trajectory of an object means the time series of the spatial desired orientation of the object. The yaw axis means the axis in the direction perpendicular to a floor surface in an environment in which a mobile robot and an object move or an axis in the vertical direction. In this case, "the perpendicular direction" or "the vertical direction" does not have to be a perpendicular direction or a vertical direction in a strict sense, and they may slightly deviate from the perpendicular direction or the vertical direction in a strict sense.

According to the first aspect of the invention, the position of the representative point of the object, when the object is observed in the yaw axis direction, in the object coordinate system fixed with respect to the object, is variably set at least in accordance with the change of the desired posture about the yaw axis in the desired posture trajectory. By doing so, it becomes possible to variably set the position of the representative point of the object to the position suitable for the changing pattern of the desired posture of the object. Thereafter, the motion of the mobile robot is controlled so that the position of the representative point of the object set variably and the posture of the object follow the desired position trajectory and the desired posture trajectory, respectively.

By doing so, it becomes possible to carry out movement of the object suitable for the changing pattern of the desired posture of the object.

In the first aspect of the invention, more specifically, the object representative point setter sets, of spatial desired route of the representative point of the object defined by the desired position trajectory, the representative point of the object to a position adjacent to one end of the object, in a first section in which an amount of change of the desired posture about the yaw axis in the desired posture trajectory is equal to or less than a predetermined amount (a second aspect of the invention).

According to the second aspect of the invention, in the first section in which the amount of change of the desired posture about the yaw axis in the desired posture trajectory (for example, the amount of change per predetermined period of time) is equal to or less than the predetermined amount, that is, in the section in which the desired posture of the object is maintained constant or substantially constant, the representative point of the object is set to the position adjacent to one end of the object (close to the predetermined portion), that is, to the position relatively close to the mobile robot. Therefore, the moment of inertia of the object about the yaw axis passing the representative point in the first section becomes relatively large, so that the stability of the posture of the object is increased. Further, it becomes possible to reduce the situation where the mobile robot must move relatively greatly in the lateral direction with respect to the spatial desired route of the representative point of the object defined by the desired position trajectory in order to make the posture of the object follow the desired posture trajectory. Consequently, it becomes possible to increase the traveling speed of the mobile robot and the object.

Further, in the first aspect of the invention, it is preferable that the object representative point setter sets, of a spatial desired route of the representative point of the object defined by the desired position trajectory, the positions of the representative point of the object to be different from each other between a first section in which the amount of change of the desired posture about the yaw axis in the desired posture trajectory is equal to or less than a predetermined amount, and a second section in which the amount of change of the desired posture exceeds the predetermined amount, and also sets the position of the representative point of the object so that a moment of inertia of the object about the yaw axis passing the representative point of the object in the second section becomes smaller than the moment of inertia of the object about the yaw axis passing the representative point of the object in the first section (a third aspect of the invention).

According to the third aspect of the invention, the moment of inertia of the object about the yaw axis passing the representative point of the object set in the second section (that is, the section in which the desired posture of the object changes greatly than in the first section) is smaller than the moment of inertia of the object about the yaw axis passing the representative point of the object set in the first section (that is, the section in which the desired posture of the object is maintained constant or substantially constant). Therefore, it is possible to increase the stability of the posture of the object in the first section in which the desired posture of the object is maintained constant or substantially constant. On the other hand, in the second section in which the change of the desired posture of the object becomes relatively large, it becomes possible to carry out change of the posture of the object in order to make the posture about the yaw axis of the object follow the desired posture easily.

Further, in the first aspect of the invention, it is preferable that the object representative point setter sets, of a spatial desired route of the representative point of the object defined by the desired position trajectory, the positions of the representative point of the object to be different from each other between a first section in which the amount of change of the desired posture about the yaw axis in the desired posture trajectory is equal to or less than a predetermined amount, and a second section in which the amount of change of the desired posture exceeds the predetermined amount, and also sets the position of the representative point of the object such that a maximum turning radius of a contour of the mobile robot and the object in the case where the mobile robot and the object as a whole is turned about the yaw axis taking the representative point of the object in the second section as a center thereof, is smaller than the maximum turning radius of the contour of the mobile robot and the object in the case where the mobile robot and the object as a whole is turned about the yaw axis taking the representative point of the object in the first section as a center thereof (a fourth aspect of the invention).

According to the fourth aspect of the invention, the maximum turning radius of the contour of the mobile robot and the object in the case where the mobile robot and the object as a whole is turned about the yaw axis taking the representative point of the object set in the second section (that is, the section in which the desired posture of the object changes greatly than in the first section) as the center thereof is smaller than the maximum turning radius of the contour of the mobile robot and the object as a whole in the case where the mobile robot and the object as a whole is turned about the yaw axis taking the representative point of the object set in the first section (that is, the section in which the desired posture of the object is maintained constant or substantially constant) as the center thereof.

Therefore, in the second section in which the change of the desired posture of the object becomes relatively large, it becomes possible to decrease the width of the moving region of the object and the mobile robot as a whole. Consequently, it becomes possible to move the object while avoiding collision between the object or the mobile robot and the obstacles at the side of the desired route, even in the case where the object is revolved in a narrow pathway.

Making the moment of inertia of the object or the maximum turning radius of the contour of the mobile robot and the object differ between the first section and the second section, as is explained above, may be carried out for example by the following. That is, in the second aspect of the invention, it is preferable that the object representative point setter sets, in the second section of the desired route in which the amount of change of the desired posture about the yaw axis in the desired posture trajectory exceeds the predetermined amount, the position of the representative point of the object at a position farther away from the mobile robot than the position of the representative point of the object set in the first section, between the position of the representative point of the object set in the first section and the other end of the object (a fifth aspect of the invention).

According to the fifth aspect of the invention, it becomes possible to make the moment of inertia of the object about the yaw axis passing the representative point of the object set in the second section to be smaller than that in the first section. Further, it becomes possible to make the maximum turning radius of the contour of the mobile robot and the object as a whole in the case where the mobile robot and the object as a whole is turned about the yaw axis taking the representative point set in the second section as the center thereof to be smaller than the maximum turning radius of the contour of the mobile robot and the object as a whole in the case where the mobile robot and the object as a whole is turned about the yaw axis taking the representative point set in the first section as the center thereof.

Therefore, it becomes possible to carry out the change in the posture of the object in order to make the posture about the yaw axis of the object in the second section follow the desired posture easily, and also make the width of the moving region of the object and the mobile robot as a whole in the second section small. Consequently, it becomes possible to move the object while avoiding collision between the object or the mobile robot and the obstacles at the side of the desired route, even in the case where the object is revolved in the narrow pathway.

In the fifth aspect of the invention, it is preferable that the object representative point setter is a unit which sets the position of the representative point of the object on a line segment connecting a first point preliminarily set at a position adjacent to one end of the object, and a second point preliminarily set at a position farther away from the mobile robot than the first point between the first point and the other end of the object, and at the same time sets the position of the representative point of the object in the first section to the position of the first point, and sets the position of the representative point of the object in the second section in accordance with the amount of change of the desired posture, so that the position of the representative point of the object becomes closer to the position of the second point as the amount of change of the desired posture about the yaw axis is larger, and the second point is a point in which, of the points on the line segment, the maximum turning radius of the contour of the mobile robot and the object becomes minimum, when turning the mobile robot and the object as a whole is turned about the yaw axis taking the point as a center thereof (a sixth aspect of the invention).

According to the sixth aspect of the invention, in the case where the amount of change of the desired posture about the yaw axis of the object in the second section is relatively large, the representative point of the object is set to the second point or to the point close thereto, so that it becomes possible to change the posture about the yaw axis of the object while making the width of the moving region of the object and the mobile robot as a whole as small as possible. Further, in the case where the amount of change of the desired posture about the yaw axis of the object in the second section is relatively small, the representative point of the object is set to the point close to the first point, so that it becomes possible to increase the stability of the posture or the traveling speed of the object, than in the case where the amount of change of the desired posture is relatively large.

In the first through sixth aspect of the invention, it is preferable that the object representative point setter gradually changes the position of the representative point, when changing the position of the representative point of the object (a seventh aspect of the invention).

According to the seventh aspect of the invention, it becomes possible to prevent the motion of the mobile robot from changing abruptly.

BRIEF DESCRIPTION OF THE DRAWINGS

FIGS. 5 (*a*) and (*b*) are view for explaining the conventional problems.

DETAILED DESCRIPTION OF THE PREFERRED EMBODIMENTS

Figure 1:
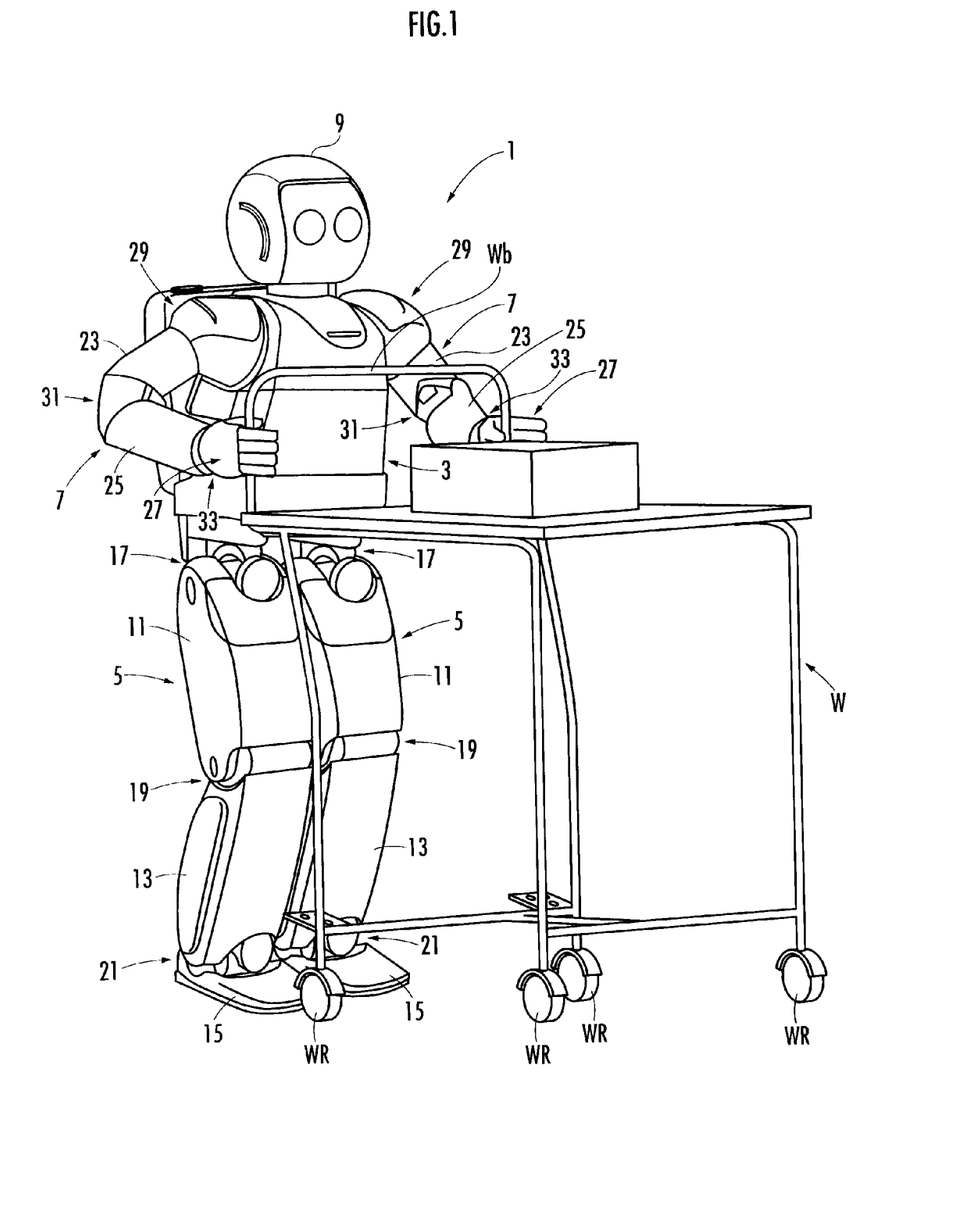
FIG. 1 is an external perspective view of a mobile robot and an object according to an embodiment of the present invention.
Figure 2:
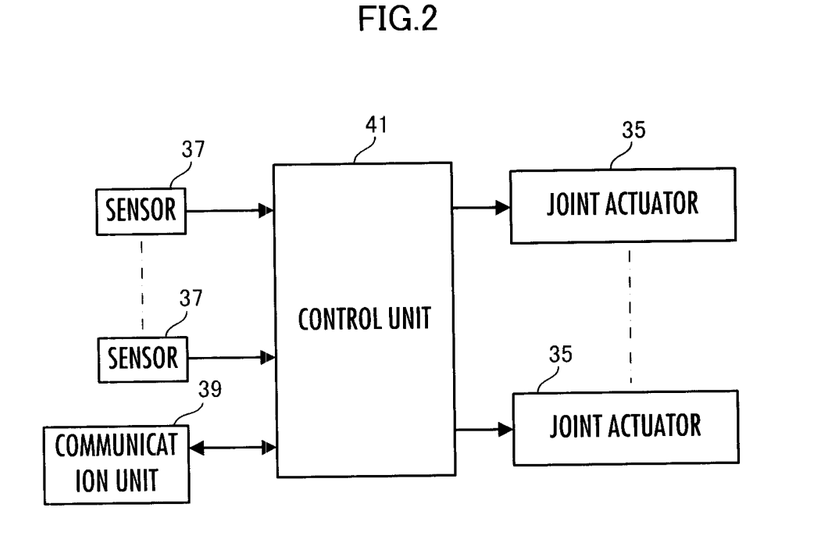
FIG. 2 is a block diagram illustrating the system construction related to the motion control of the mobile robot in the embodiment.
Figure 3:
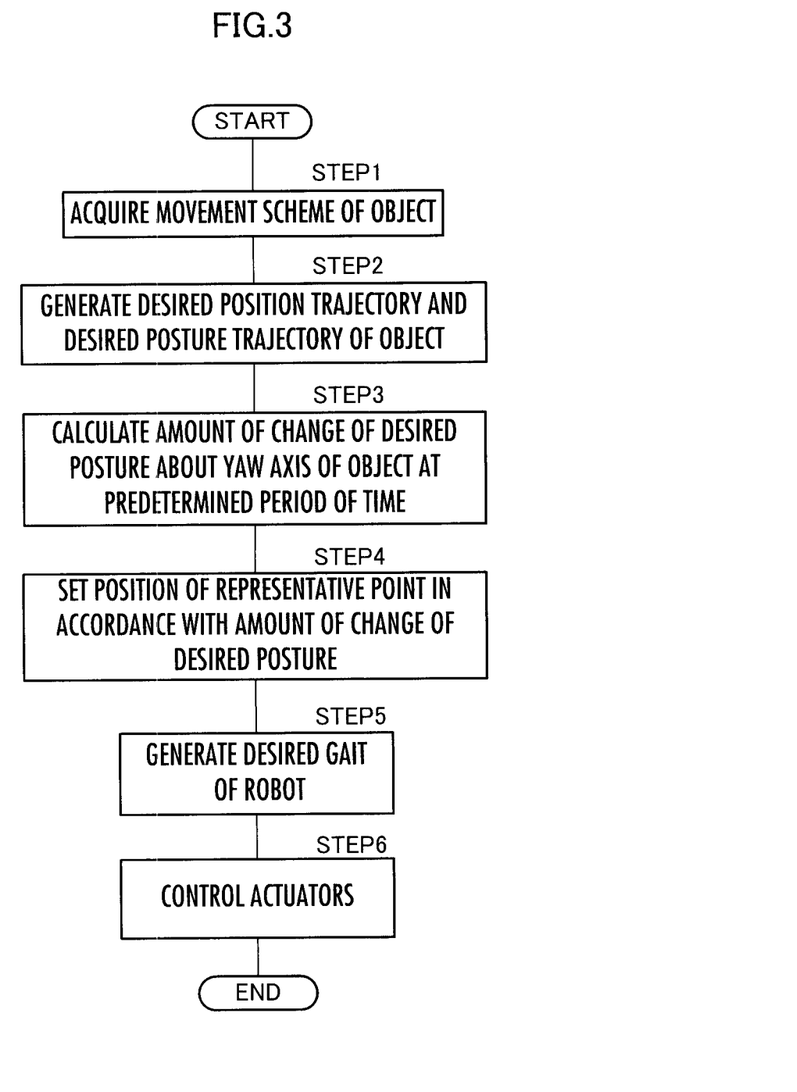
FIG. 3 is a flow chart illustrating the processing by a controller provided in the mobile robot of the embodiment.
Figure 4:
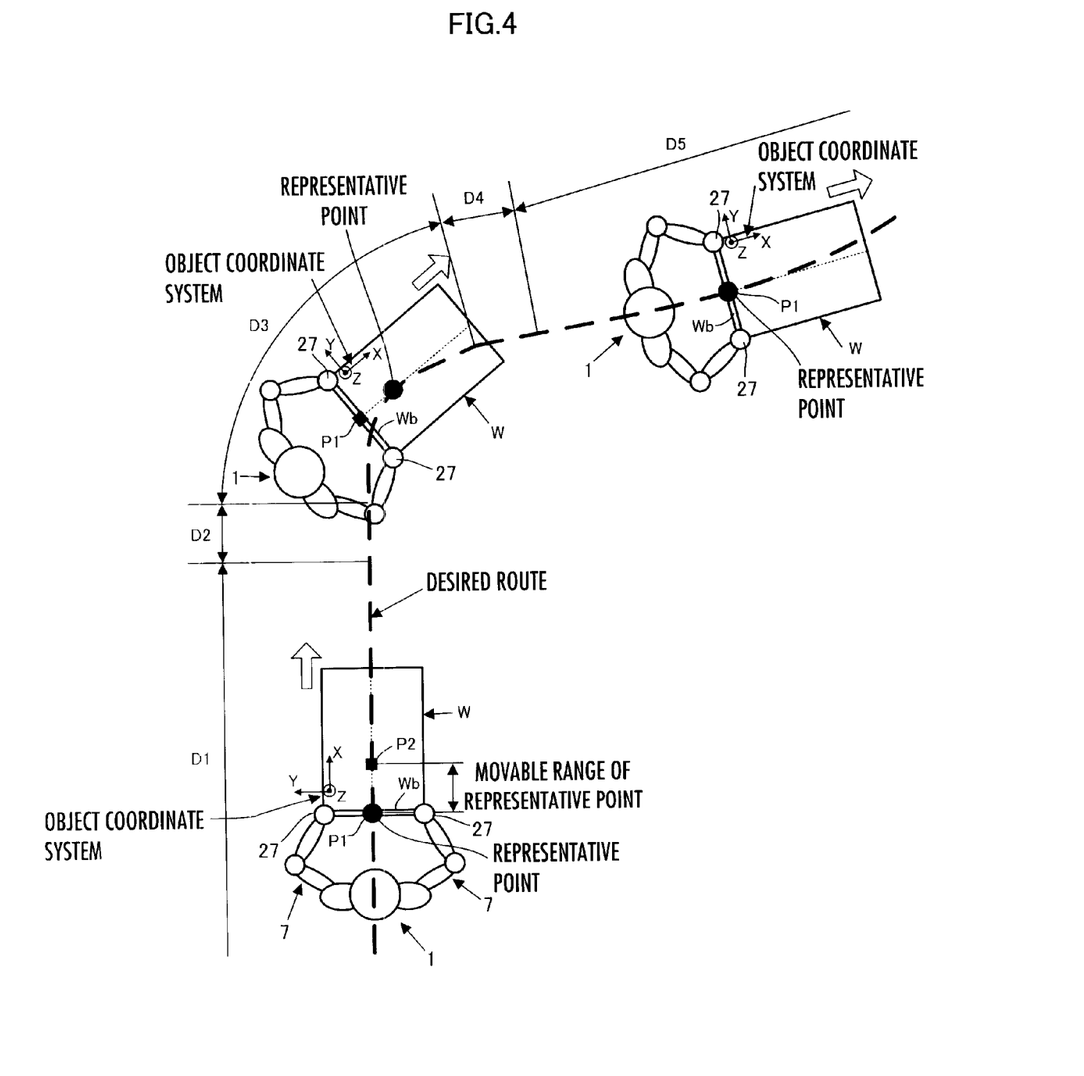
FIG. 4 is a view for explaining the operation of the embodiment.

An embodiment according to the present invention will now be explained below with reference to FIG. 1 through FIG. 4. FIG. 1 is an external perspective view of a mobile robot and an object according to an embodiment of the present invention, FIG. 2 is a block diagram illustrating the system construction related to the motion control of the mobile robot in the embodiment, FIG. 3 is a flow chart illustrating the processing by a controller provided in the mobile robot of the embodiment, and FIG. 4 is a view for explaining the operation of the embodiment.

Referring to FIG. 1, a mobile robot 1 according to the present embodiment is a bipedal mobile robot (humanoid robot). The bipedal mobile robot 1 has a body 3 serving as the basic body thereof, a pair of right and left legs 5, 5 extending from the bottom end of the body 3, a pair of right and left arms 7, 7 extending from both sides of the upper portion of the body 3, and a head 9 disposed on the upper end of the body 3.

Each of the legs 5 is constructed of a first leg link 11, a second leg link 13, and a foot 15, which are connected in this order from the body 3 side, the distal portion of the leg 5 being composed of the foot 15 serving as a ground-contacting portion. In this case, the first leg link 11 of the leg 5 is connected to the body 3 through the intermediary of a hip joint 17 having the freedom degree of rotation about three axes. The second leg link 13 is connected to the first leg link 11 through the intermediary of a knee joint 19 having the freedom degree of rotation about one axis. The foot 15 is connected to the second leg link 13 through the intermediary of an ankle joint 21 having the freedom degree of rotation about two axes. The legs 5 are capable of performing motions similar to those of human legs by means of the rotational motions of the joints 17, 19 and 21. In this case, for example, the mobile robot 1 is capable of traveling by alternately implementing, on the two legs 5 and 5, a motion in which one leg 5 which is the leg 5 serving as a free leg is lifted in the air and moved while the other leg 5 which is the leg 5 serving as the supporting leg is maintained in contact with a floor in the environment in which the mobile robot 1 is traveling, and then the free leg is landed.

Each of the arms 7 is constituted of a first arm link 23, a second arm link 25, and a hand 27, which are connected in this order from the body 3 side, the distal portion of each of the arms 7 being composed of the hand 27. In this case, the first arm link 23 of each of the arms 7 is connected to the body 3 through the intermediary of a shoulder joint 29 having the freedom degree of rotation about three axes. The second arm link 25 is connected to the first arm link 23 through the intermediary of an elbow joint 31 having the freedom degree of rotation about one axis. The hand 27 is connected to the second arm link 25 through the intermediary of a wrist joint 33 having the freedom degree of rotation about three axes. Further, each of the arms 7 is capable of performing motions similar to those of a human arm, such as bringing the hand 27 into contact with an object, by means of the rotational motions of the joints 29, 31 and 33. The hand 27 is equipped with a plurality of fingers, which enable the hand 27 to perform an operation, such as holding an object, by moving the joints of the fingers (e.g., by bending and stretching the fingers).

Although not shown in FIG. 1, the mobile robot 1 is provided with, as the system for controlling the motions thereof, a plurality of joint actuators 35, 35 and so on of electric motors for driving the joints, including the finger joints of the hands 27, of the legs 3 and the arms 4, various sensors 37, 37 and so on for detecting the motional states of the mobile robot 1 and the environmental information on the surroundings thereof, a communication unit 39 for performing communication with external server or the like, and a control unit 41, as illustrated in FIG. 2.

The sensors 37 include, for example, the force sensors for detecting floor reaction forces acting on the feet 15 when the feet 15 of the legs 3 land on the ground, the force sensors for detecting reaction forces acting on the hands 27 when the hands 27 of the arms 4 are brought in contact with an object, an acceleration sensor for detecting the acceleration of the body 3, a rate sensor for detecting the angular velocity of the body 3, a tilt sensor for detecting the tilt angle of the body 3, joint displacement sensors for detecting the displacement amounts (rotational angles) of the joints, and an imaging camera for acquiring images of ambient environments, including an area ahead of the mobile robot 1.

The control unit 41 is an electronic circuit unit which includes a microcomputer, an interface circuit, and an actuator drive circuit. The control unit 41 uses the detection data of the sensors 37 and command data supplied through the intermediary of the communication unit 39 to carry out arithmetic processing specified by a preinstalled program or a program downloaded, as necessary, thereby sequentially determining the manipulated variables of the joint actuators 35 (e.g., command currents of the electric motors). Then, the control unit 41 controls the joint actuators 35 on the basis of the manipulated variables so as to control the motions of the mobile robot 1. The control unit 41 includes the function as an object representative point setter in the present invention, which is a function implemented by the arithmetic processing thereby.

The operation whereby an object is moved by the mobile robot 1 described above will now be described. For this purpose, the case where, for instance, a cart W shown in FIG. 1 as the object is moved will be taken as the example. The object (cart) W illustrated in FIG. 1 is equipped with a plurality of wheels WR which come in contact with a floor surface of an environment in which the object W is moved and the mobile robot 1 travels. The rotation of the wheels WR allows the object W to move on the floor surface. Each of the wheels WR of the object W can be rotated about a vertical axis, thus enabling the direction of the object W to be changed.

When moving the object (cart) W by the mobile robot 1, the control unit 41 controls the joint actuators 35 of the arms 7 and the like of the mobile robot 1 on the basis of the command data input from an external server and the like through the intermediary of the communication unit 39, so as to bring the hands 27, 27 of the two arms 7, 7 of the mobile robot 1 into contact with a predetermined portion adjacent to a lengthwise end of the object W.

For example, as illustrated in FIG. 1, with the mobile robot 1 standing opposing one end, namely, the rear end, in the lengthwise direction (longitudinal direction) of the object W, the portions at both ends of a bar Wb provided above the rear edge of the object W are held by the right and left hands 27, 27. In this case, the mobile robot 1 stands opposing the object W in a position and a posture which do not cause the arms 7, 7 to fully stretch and the body 3 or the like to interfere with the object W.

Supplementally, the portions to be held by the hands 27, 27 of the mobile robot 1 do not have to be the bar Wb. For example, the portions at both ends adjacent to the rear edge of a rack plate at the top of the cart W illustrated in FIG. 1 may be grasped by the hands 27, 27.

Subsequently, the control unit 41 sequentially carries out the processing illustrated by the flowchart in. FIG. 3 at a predetermined arithmetic processing cycle to cause the mobile robot 1 to perform the operation of moving the object W.

In this processing, the control unit 41 acquires a movement scheme of the object W from an external server and the like through the intermediary of the communication unit 39 (STEP 1). The movement scheme provides a demand guideline indicating how the object W should be moved at proper timings. The movement scheme acquired in STEP 1 includes at least the movement scheme of the object W in a future predetermined period of time from the current time. The predetermined period of time is, for example, a period of time for a predetermined plurality of steps (e.g., a period of time for three steps) of the mobile robot 1. The predetermined period of time may be, for example, the period of time until predetermined time elapses from the current time or the period of time until the distance of the object W reaches a predetermined distance when the object W is moved from the current position thereof according to the movement scheme.

The processing in STEP1 does not have to be carried out at each arithmetic processing cycle of the control unit 41; instead, it may be carried out each time the aforesaid predetermined period of time elapses. The movement scheme of the object W over the whole process from the start point to the arrival point of the movement of the object W may be acquired at the start of the movement of the object W or immediately before the start. Further alternatively, the movement scheme of the whole process of the object W may be retained in a storage device of the control unit 41 in advance.

Subsequently, the control unit 41 generates a desired position trajectory and a desired posture trajectory of the object W from the current time to the future on the basis of the movement scheme acquired in STEP1 (STEP2). The desired position trajectory of the object W is the time series of the desired position of the representative point (the point which represents the spatial position of the object W) of the object W. The representative point is set variably, as is explained later in the present embodiment. Further, the desired posture trajectory of the object W means the time series of the desired posture of the object W. Moreover, "posture" means the spatial orientation.

The desired position trajectory and the desired posture trajectory are basically generated to follow the movement scheme of the object W. However, the mobile robot 1 according to the present embodiment is a bipedal mobile robot, so that an attempt to move the object W exactly according to the movement scheme may impair the stability of the posture of the mobile robot 1. Hence, according to the present embodiment, in the processing in STEP2, the control unit 41 generates a provisional desired position trajectory and a provisional desired posture trajectory of the object W exactly in accordance with the movement scheme, and then performs the calculation to predict the future motions of the mobile robot 1 on the assumption that the object W is moved according to the provisional desired position trajectory and the provisional desired posture trajectory. Then, the control unit 41 determines whether the future motions of the mobile robot 1 predicted by calculation will allow the stability of the posture of the mobile robot 1 to be properly maintained. If the determination result is affirmative, then the control unit 41 determines the provisional desired position trajectory and the provisional desired posture trajectory of the object W directly as the actual desired position trajectory and the actual desired posture trajectory, respectively, of the object W. If the determination result is negative, then the control unit 41 corrects either one of or both of the provisional desired position trajectory and the provisional desired posture trajectory, and then determines the corrected desired position trajectory and the desired posture trajectory as the actual desired position trajectory and the actual desired posture trajectory, respectively, of the object W. In this case, either one of or both of the desired position trajectory and the desired posture trajectory are corrected such that the corrected desired position trajectory and the desired posture trajectory of the object W follow the movement scheme of the object W as closely as possible and the future motions of the mobile robot 1 predicted on the basis of the corrected desired position trajectory and the desired posture trajectory allow the stability of the posture of the mobile robot 1 to be properly secured.

It is assumed that, for instance, the movement scheme of the object W is designed to move the object W at a maximum traveling speed or a traveling speed close thereto for the mobile robot 1 to travel straight, and the desired route of the object W defined by the desired position trajectory based on the movement scheme of the object W has a section with a relatively acute curve in the middle thereof. In this case, in such section, it is frequently difficult to secure the stability of the posture of the mobile robot 1 while moving the object W and the mobile robot 1 at the maximum traveling speed or the speed close thereto. In such a case, the desired position trajectory of the object W is corrected such that the moving speed of the object W is lower than the moving speed based on the movement scheme in the particular section and the sections immediately preceding and following the particular section.

The desired position trajectory and the desired posture trajectory of the object W described above may be generated using the same technique as the technique proposed in, for example, the aforesaid patent document 1. In this case, the desired position trajectory and the desired posture trajectory of the object W are described by means of a supporting leg coordinate system which is set using, as the origin, the point on the ground contact surface of the foot 15 of the supporting leg of the two legs 5, 5 of the mobile robot 1. However, the coordinate system for describing the desired position trajectory and the desired posture trajectory of the object W is not limited to the aforesaid supporting leg coordinate system; it may be, for example, a coordinate system fixedly set on the floor on which the object W is moved and the mobile robot 1 travels (an absolute coordinate system).

In the present embodiment, the desired posture in the desired posture trajectory of the object W is set as a posture in which the lengthwise direction of the object W (longitudinal direction of the object W) is the same as the direction of the moving velocity vector of the representative point, which is the change vector per unit time of the desired position of the representative point of the object W in the desired position trajectory. In other words, the desired posture of the object W is set as a posture in which the lengthwise direction of the object W when the object W is observed in a yaw axis direction faces the tangential direction of the spatial desired route of the representative point of the object W defined by the desired position trajectory. The yaw axis direction means a direction perpendicular to a floor surface or a direction in the vertical direction. It is not necessary to always make the lengthwise direction of the object W and the direction of the moving velocity vector of the representative point of the object W to be in the same direction. For example, it is also possible to have an angular difference about the yaw axis between the lengthwise direction of the object W in the desired posture of the object W and the moving velocity vector of the representative point of the object W.

When determining the desired position trajectory and the desired posture trajectory of the object W, consideration may be given to existence or nonexistence of an interference between obstacles (installed object, wall, or the like) in the vicinity of the desired route of the representative point of the object W defined by the desired position trajectory, and the object W or the mobile robot 1.

After generating the desired position trajectory of the representative point of the object W and the desired posture trajectory of the object W is as explained above, the control unit 41 calculates an amount of change of the desired posture about the yaw axis of the object W at a future predetermined period of time from the current time (STEP3). The predetermined period of time is, for example, a period of time for a predetermined plurality of steps (for example, a period of time for three steps) of the mobile robot 1. The predetermined period of time may be, for example, the period of time until predetermined time elapses from the current time, or the period of time until the moving distance of the object W reaches a predetermined distance when the object W is moved from the current position thereof along the desired position trajectory. Further, the amount of change of the desired posture about the yaw axis calculated in STEP3 is specifically an angular difference about the yaw axis between the lengthwise direction (longitudinal direction) of the object W defined by the desired posture of the object W at the current time, and the lengthwise direction of the object W defined by the desired posture of the object W at the end of the predetermined time.

Subsequently, the control unit 41 variably sets the position of the representative point of the object W, in accordance with the amount of change of the desires posture calculated in STEP3 (STEP4). In this case, the position of the representative point variably set is the position of the representative of the object W in the object coordinate system fixed to the object W as observed in the yaw-axis direction.

For example, as illustrated in FIG. 4, a case is assumed where a three-axis orthogonal coordinate system having the direction of the yaw axis thereof defined as the z-axis direction (the direction perpendicular to the paper surface of FIG. 4), the lengthwise direction (longitudinal direction) of the object W defined as the x-axis direction, and the width direction of the object W defined as the y-axis direction has been set for the object (cart) W as the object coordinate system. FIG. 4 illustrates by example an instantaneous operating state (three types of the operating state) during movement of the object W and the mobile robot 1, in the case where the desired route defined by the desired position trajectory of the object W when observed in the yaw axis direction is a route as is indicated by a broken line in the figure. In FIG. 4, the object W and the mobile robot 1 are illustrated schematically.

In this case, the control unit 41 variably sets the position of the representative point on the XY plane of the object coordinate system on a line segment connecting preset points P1 and P2, as illustrated in FIG. 4. The point P1 is a point adjacent to the rear end of the object W (adjacent to one end of the object W on the mobile robot 1 side). In the illustrated example, the point P1 is the central point between the portions on both ends of the bar Wb of the object W (the portions grasped by the hands 27, 27 of the mobile robot 1), i.e., the central point of the rear end portion in the width direction of the object W.

The point P2 is a point between the point P1 and the front end (the other end) of the object W and the point is farther toward the front end of the object W than the point P1 from the mobile robot 1. In the illustrated example, the point P2 is the point which has been moved from the point P1 by a predetermined distance toward the front end of the object W in the x-axis direction of the object coordinate system (in the direction away from the mobile robot 1). In this case, assuming a case where the object W and the mobile robot 1 as a whole are turned about the yaw axis (about the Z axis), taking an arbitrary point on the line segment connecting the points P1 and P2 as the center thereof, a maximum turning radius of a contour of the object W and the mobile robot 1 as a whole (of the object W and the mobile robot 1 as a whole, a turning radius of a portion most distant from the rotational center thereof) becomes smaller as the rotational center becomes closer to the point P2. Therefore, the point P2 is, of the points on the line segment connecting the point P1 and point P2, the point in which the maximum turning radius of a contour of the object W and the mobile robot 1 as a whole when the object W and the mobile robot 1 as a whole is turned about the yaw axis taking the point as the center thereof becomes the smallest. In the present embodiment, the point P2 is set to a point in which the maximum turning radius becomes minimum (including the case where it is close to minimum), among all the points including the points on the line segment.

In the processing in STEP5, in the case where the amount of change of the desired posture of the object W calculated in STEP3 is equal to or less than a predetermined amount, that is, in a case where the desired route of the object W defined by the desired position trajectory in the predetermined period of time related to the amount of change is straight or a route close to straight and the amount of change of the desired posture within the predetermined period of time is minute, the control unit 41 sets the position of the representative point of the object W to the position of the point P1. Further, in the case where the amount of change of the desired posture of the object W exceeds the predetermined amount, the control unit 41 sets the position of the representative point of the object W in accordance with the amount of change of the desired posture, such that the position of the representative point of the object W becomes closer to the point P2 (moves away from the mobile robot 1 in the x-axis direction) as the amount of change becomes larger.

In changing the position of the representative point of the object W, the control unit 41 sets the position of the representative point so that the position thereof changes gradually from the current position of the representative point to the position of the representative point in accordance with the amount of change of the desired posture.

By variably setting the position of the representative point of the object W as is explained above, in a section in which the desired route of the object W defined by the desired position trajectory becomes straight or substantially straight (a section in which the amount of change of the desired posture becomes equal to or less than the predetermined amount), for example as in a section D1 and a section D5 in FIG. 4, the position of the representative point of the object W is set to the position of the point P1. Further, in a section in which the desired route curves relatively abruptly (a section in which the amount of change of the desired posture exceeds the predetermined amount), for example as in a section D3 in FIG. 4, the position of the representative point of the object W is set to a position farther away from the mobile robot 1 towards the front end side of the object W than the point P1 (provided that the position is on a line segment connecting the points P1 and P2). Still further, in a section D2 between the section D1 and the section D3 shown in FIG. 4, the position of the representative point of the object W is set so as to gradually change from the position of point P1 (position at the section D1) towards the position at the section D3. Similarly, in a section D4 between the section D3 and the section D5 shown in FIG. 4, the position of the representative point of the object W is set so as to gradually change from the position in the section D3 to the position at the section D5 (position of the point P1).

Supplementally, the processing in STEP4 described above constitutes the object representative point setter in the present invention. Further, the points P1 and P2 corresponds to the first point and the second point, respectively, in the present invention. Still further, the sections D1 and D5 in FIG. 4 correspond to the first section in the present invention, and the section D3 corresponds to the second section in the present invention.

In FIG. 4, an example where the desired route of the object W curves relatively greatly at the midstream thereof is shown. However, in the case where the overall desired route is straight or is a route close to straight, the position of the representative point of the object W is steadily set to the position of the point P1. Further, in the case where the desired route of the object W has a section at the midstream thereof in which the desired position of the representative point of the object W becomes substantially constant and also the desired posture thereof changes relatively greatly, that is, in the case where the section includes an area where the posture is changed without moving the position of the object W so much, the position of the representative point of the object W at that area is set to a position closer to the point P2.

After setting the position of the representative point of the object W as described above, the control unit 41 generates a desired gait of the mobile robot 1 (STEP5). In this case, the desired gait of the mobile robot 1 is generated such that the position of the representative point of the object W set in STEP4 and the posture of the object W are made to follow the desired position trajectory and the desired posture trajectory respectively generated in STEP2, and the stability of the posture of the mobile robot 1 is maintained. The desired gait can be generated by the same technique as that proposed in the aforesaid patent document 1. The desired gait in this case is composed primarily of a desired position/posture trajectory of the foot 15 of each leg 5 (the time series of the desired position and the desired posture of the foot 15), a desired position/posture trajectory of the body 3 (the time series of the desired position and the desired posture of the body 3), a desired ZMP trajectory (the time series of the desired position of the so-called ZMP), a desired total floor reaction force trajectory (the time series of the desired value of the total floor reaction force acting on the mobile robot 1), and a desired position/posture trajectory of the hand 27 of each arm 7 (the time series of the desired position and the desired posture of the hand 27). The ZMP here means the point on a floor surface at which the moment of the resultant force of the gravitational force acting on the mobile robot 1, the inertial force generated by a motion of the mobile robot 1, and the reaction force acting on the mobile robot 1 from the object W becomes zero, excluding the component about the vertical axis thereof.

Subsequently, the control unit 41 controls the joint actuators 35 of the legs 5, 5 and the arms 7, 7 of the mobile robot 1 on the basis of the desired gait of the mobile robot 1 generated as described above (STEP6). More specifically, the control unit 41 determines the desired displacement amounts of the joints of the legs 5, 5 and the arms 7, 7 on the basis of the desired gait, and determines the manipulated variables of the joint actuators 35 on the basis of the desired displacement amounts. Then, the joint actuators 35 are controlled on the basis of the manipulated variables.

The processing in STEP1 to STEP6 described above is sequentially carried out at a predetermined arithmetic processing cycle. Thus, the motions of the mobile robot 1 are controlled such that the position of the representative point of the object W and the posture of the object W follow the desired position trajectory and the desired posture trajectory, respectively, thereby moving the object W by the mobile robot 1.

According to the present embodiment, in the section in which the desired posture about the yaw axis of the object W is maintained constant or substantially constant (the section in which the amount of change of the desired posture about the yaw axis per predetermined period of time is equal to or less than the predetermined amount), such as the sections D1 and D5 in FIG. 4, the position of the representative point of the object W is set to the position of the point P1 adjacent to one end of the object W on the mobile robot 1 side (rear end side). Therefore, the moment of inertia of the object W about the yaw axis passing the representative point becomes relatively large. Consequently, the stability of the posture of the object W is increased. Further, in the case where the posture about the yaw axis of the object W deviates with respect to the desired posture, the amount of movement of the mobile robot 1 in the lateral direction (the direction substantially orthogonal to the desired route of the object W) in order to resolve the deviation is suppressed to minimum.

Therefore, it becomes possible to make the posture of the object W follow the desired posture trajectory stably, while increasing the traveling speed of the object W.

Further, in the section in which the desired posture about the yaw axis of the object W changes relatively greatly (the section in which the amount of change of the desired posture about the yaw axis per predetermined period of time exceeds the predetermined amount), such as the section D3 in FIG. 4, the position of the representative point of the object W is set to a position deviating from the point P1 towards the point P2 side. Therefore, when changing the posture of the object W by turning the object W about the yaw axis passing the representative point of the object W, it becomes possible to make the maximum turning radius of the contour of the object W and the mobile robot 1 as a whole small. Consequently, the width of the moving region of the object W and the mobile robot 1 as a whole (width in the lateral direction with respect to the desired route of the object W) may be made small. As a result, it becomes possible to avoid the object W or the mobile robot 1 from colliding with the obstacles at the side of the desired route of the object W, even in the case where the object W is revolved in a relatively narrow pathway. Further, the moment of inertia about the yaw axis passing the representative point of the object W becomes smaller than in the case where the representative point is set to the position of the point P1, it becomes possible to change the posture of the object W easily. Moreover, the position of the representative point of the object W in the section is set to the position closer to the point P1 as the amount of change of the desired posture of the object W becomes smaller, so that the amount of movement of the mobile robot 1 in the lateral direction in the case where the posture of the object W deviates from the desired posture is made relatively small, in the section in which the amount of change of the desired posture is not so big. Therefore, it becomes possible to suppress the decrease of the traveling speed of the object W to its requisite minimum.

Further, when changing the position of the representative point of the object W, such change is carried out gradually, so that it becomes possible to suppress the movement of the mobile robot from changing abruptly.

The embodiments of the present invention are not limited to the one described above, but can be implemented in various modifications. The following will describe some examples of the modifications.

The mobile robot may be a mobile robot of a type other than a bipedal mobile robot. The present invention may be applied to, for example, a legged mobile robot having three or more legs or a mobile robot which has a plurality of rotatable spherical components in contact with a floor and which moves by rotating the spherical components. The present invention applies to any mobile robot as long as the advancing direction thereof can be changed about the yaw axis.

Further, the mobile robot may be a mobile robot having three or more arms or a mobile robot having only one arm. The arm may be designed such that only the distal portion thereof can be moved with respect to the body of the mobile robot.

The distal portion of the arm of the mobile robot which comes in contact with a portion adjacent to one end of an object does not necessarily have to be constructed to grasp the portion. The distal portion of the arm may be constructed to, for example, simply touch the surface portion adjacent to one end of the object or constructed to be fitted to the portion adjacent to one end of the object.

The object to be moved by the mobile robot may not be equipped with wheels. The object may be, for example, a substance having the flat portion of the bottom surface thereof directly in contact with a floor surface (e.g., a simply box-like substance). Further, an object may be moved without letting the object come in contact with a floor surface. The present invention may be applied also to a case where a portion of a substance, such as a lengthy plate, adjacent to one end thereof is held by an arm of a mobile robot and the substance is moved by lifting the whole substance off a floor. The present invention is especially suited for moving a substance having a relatively large distance between a portion adjacent to one end to be in contact with the distal portions of arms of a mobile robot and a portion adjacent to the other end.

If an object is moved by a mobile robot having high stability, such as a mobile robot with three legs or more or a mobile robot which moves with a plurality of rotatable spherical components which come in contact with a floor, it is also possible to prepare the desired position trajectory and the desired posture trajectory of the object for the whole process of its movement, before commencing the movement of the object. The preparation thereof may be carried out at a server outside the mobile robot or the like. Still further, in the case where the desired position trajectory and the desired posture trajectory of the object for the whole process of its movement are prepared before commencing the movement of the object, it is also possible to set the positions of the representative point for the whole process of its movement before commencing the movement of the object.

The invention claimed is:

1. A controller for an associated mobile robot, the controller configured to control the associated mobile robot to make the associated mobile robot perform a task of moving an associated object so as to make a position on the associated object of a representative point of the associated object and a posture of the associated object follow a desired position trajectory and a desired posture trajectory, respectively, in the state of contacting a distal portion of an arm of the associated robot to a predetermined portion adjacent to one end of the associated object, the controller comprising:

an object representative point setter configured to variably set a position of the representative point of the associated object in an object coordinate system fixed with respect to the associated object and oriented perpendicularly to a yaw axis, the object representative point setter configured to variably set the position of the representative point of the associated object based on a change in a desired posture about the yaw axis in the desired posture trajectory, wherein the controller is configured to make the associated robot perform the task of moving the associated object so as to make the position on the associated object of the representative point of the associated object, which is variably set by the object representative point setter, and the posture of the associated object follow the desired position trajectory and the desired posture trajectory.

2. The controller according to claim 1, wherein, of for a spatial desired route of the representative point of the associated object defined by the desired position trajectory, the object representative point setter is configured to set the representative point of the associated object to a position adjacent to one end of the associated object in a first section of the desired route in which an amount of change of the desired posture about the yaw axis in the desired posture trajectory is equal to or less than a predetermined amount.

3. The controller according to claim 1, wherein, for a spatial desired route of the representative point of the associated object defined by the desired position trajectory, the object representative point setter is configured to set the position of the representative point of the associated object to be different in a first section of the desired route than in a second section of the desired route, the first section of the desired route being a section of the desired route in which the amount of change of the desired posture about the yaw axis in the desired posture trajectory is equal to or less than a predetermined amount, and the second section of the desired route being a section of the desired route in which the amount of change of the desired posture exceeds the predetermined amount, and the object representative point setter is configured to set the position of the representative point of the associated object so that a moment of inertia of the associated object about the yaw axis passing the representative point of the associated object in the second section becomes smaller than the moment of inertia of the associated object about the yaw axis passing the representative point of the associated object in the first section.

4. The controller according to claim 1, wherein, for a spatial desired route of the representative point of the associated object defined by the desired position trajectory, the object representative point setter is configured to set the position of the representative point of the associated object to be different in a first section of the desired route than in a second section of the desired route, the first section of the desired route being a section of the desired route in which the amount of change of the desired posture about the yaw axis in the desired posture trajectory is equal to or less than a predetermined amount, and the second section of the desired route being a section of the desired route in which the amount of change of the desired posture exceeds the predetermined amount, and the object representative point setter is configured to set the position of the representative point of the associated object such that a maximum turning radius of a contour of the associated mobile robot and the associated object in a case where the associated mobile robot and the associated object as a whole is turned about the yaw axis taking the representative point of the associated object in the second section as a center thereof, is smaller than the maximum turning radius of the contour of the associated mobile robot and the associated object in the case where the associated mobile robot and the associated object as a whole is turned about the yaw axis taking the representative point of the associated object in the first section as a center thereof.

5. The controller according to claim 2, wherein the object representative point setter is configured to set, in a second section of the desired route in which the amount of change of the desired posture about the yaw axis in the desired posture trajectory exceeds the predetermined amount, the position of the representative point of the associated object at a position farther away from the associated mobile robot than the position of the representative point of the associated object set in the first section, between the position of the representative point of the associated object set in the first section and the other end of the associated object.

6. The controller according to claim 5, wherein the object representative point setter is a unit configured to set the position of the representative point of the associated object on a line segment connecting a first point preliminarily set at a position adjacent to one end of the associated object, and a second point preliminarily set at a position farther away from the associated mobile robot than the first point between the first point and the other end of the associated object, and is configured to set the position of the representative point of the associated object in the first section of the desired route to the position of the first point, and the position of the representative point of the associated object in the second section of the desired route based on the amount of change of the desired posture, so that the position of the representative point of the associated object becomes closer to the position of the second point as the amount of change of the desired posture about the yaw axis becomes larger, and the second point is a point in which, of points on the line segment, a maximum turning radius of a contour of the associated mobile robot and the associated object becomes minimum, when turning the associated mobile robot and the associated object as a whole is turned about the yaw axis taking the point as a center thereof.

7. The controller according to claim 1, wherein, when changing the position of the representative point of the associated object, the object representative point setter is configured to gradually change the position of the representative point of the associated object.

* * * * *